US011922775B2

(12) United States Patent
Sanders et al.

(10) Patent No.: US 11,922,775 B2
(45) **Date of Patent: *Mar. 5, 2024**

(54) METHOD OF OPERATING A GAMING SYSTEM, A GAMING SYSTEM AND A GAME CONTROLLER

(71) Applicant: Aristocrat Technologies Australia Pty Limited, North Ryde (AU)

(72) Inventors: Liam Sanders, Leichhardt (AU); Matthew Chan, East Killara (AU)

(73) Assignee: ARISTOCRAT TECHNOLOGIES AUSTRALIA PTY LTD., North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/952,755

(22) Filed: Sep. 26, 2022

(65) Prior Publication Data

US 2023/0020479 A1 Jan. 19, 2023

Related U.S. Application Data

(63) Continuation of application No. 17/226,767, filed on Apr. 9, 2021, now Pat. No. 11,455,867, which is a (Continued)

(30) Foreign Application Priority Data

Sep. 23, 2015 (AU) ................................ 2015903883

(51) Int. Cl.
*G07F 17/32* (2006.01)
*G07F 17/34* (2006.01)

(52) U.S. Cl.
CPC ...... *G07F 17/3267* (2013.01); *G07F 17/3209* (2013.01); *G07F 17/3213* (2013.01); (Continued)

(58) Field of Classification Search
None
See application file for complete search history.

(56) References Cited

U.S. PATENT DOCUMENTS

| | | | |
|---|---|---|---|
| 7,530,894 | B1 | 5/2009 | Marks |
| 8,241,107 | B2 | 8/2012 | Moroney |

(Continued)

OTHER PUBLICATIONS

Notice of Allowance dated Mar. 30, 2020, for U.S. Appl. No. 16/196,124 (pp. 1-9).

(Continued)

*Primary Examiner* — Jason T Yen
(74) *Attorney, Agent, or Firm* — McAndrews, Held & Malloy, Ltd.

(57) ABSTRACT

An electronic method of operating a gaming system. The method includes selecting a plurality of symbols, displaying the selected symbols, and upon the displayed symbols including one or more designated symbols, retaining each displayed designated symbol for a subsequent game round at a respective symbol display position at which the designated symbol is displayed. The method also includes, in the subsequent game round, selecting, a plurality of symbols from the symbol data, upon a further designated symbol being selected for display at a symbol display position at which the retained designated symbol is displayed, modifying the retained designated symbol to indicate that a win containing the retained designated symbol will be increased, and upon the selected symbols in the subsequent game round corresponding to a winning outcome incorporating the modified retained designated symbol, making an award of an award value corresponding to the winning outcome modifier by the increase.

20 Claims, 7 Drawing Sheets

Related U.S. Application Data continuation of application No. 16/744,457, filed on Jan. 16, 2020, now Pat. No. 10,991,207, which is a continuation of application No. 16/196,124, filed on Nov. 20, 2018, now Pat. No. 10,726,674, which is a continuation of application No. 15/274,582, filed on Sep. 23, 2016, now Pat. No. 10,147,276.

(52) U.S. Cl.
CPC ...... *G07F 17/3225* (2013.01); *G07F 17/3246* (2013.01); *G07F 17/3251* (2013.01); *G07F 17/326* (2013.01); *G07F 17/34* (2013.01)

(56) References Cited

U.S. PATENT DOCUMENTS

| | | | | |
|---|---|---|---|---|
| 8,602,862 | B2 | 12/2013 | Gauselmann | |
| 8,864,568 | B2 | 10/2014 | Mizue | |
| 9,017,160 | B2 | 4/2015 | Moroney | |
| 9,773,369 | B2 | 9/2017 | Berman | |
| 2004/0048646 | A1 | 3/2004 | Martin | |
| 2004/0092300 | A1 | 5/2004 | Gauselmann | |
| 2004/0097279 | A1 | 5/2004 | Gauselmann | |
| 2005/0070354 | A1* | 3/2005 | Baerlocher | G07F 17/3267 463/20 |
| 2006/0068884 | A1 | 3/2006 | Baerlocher | |
| 2008/0113735 | A1 | 5/2008 | Maya | |
| 2009/0227356 | A1* | 9/2009 | Moroney | G07F 17/34 463/20 |
| 2010/0190542 | A1* | 7/2010 | Mizue | G07F 17/326 463/20 |
| 2010/0190543 | A1 | 7/2010 | Englman | |
| 2011/0136562 | A1* | 6/2011 | Loat | G07F 17/3265 463/20 |
| 2013/0252704 | A1 | 9/2013 | Gilbertson | |
| 2013/0331173 | A1* | 12/2013 | Jaffe | G07F 17/3267 463/20 |
| 2014/0051496 | A1 | 2/2014 | Meyer | |
| 2014/0274281 | A1* | 9/2014 | Jaffe | G07F 17/3213 463/20 |
| 2014/0323198 | A1 | 10/2014 | Tuck | |
| 2014/0335931 | A1* | 11/2014 | Kemper | G07F 17/326 463/20 |
| 2015/0302703 | A1* | 10/2015 | Nelson | G07F 17/3262 463/20 |
| 2015/0339889 | A1 | 11/2015 | Oropeza | |
| 2016/0321857 | A1 | 11/2016 | Meyer | |
| 2017/0024974 | A1 | 1/2017 | Berman et al. | |
| 2017/0323534 | A1 | 11/2017 | Berman | |

OTHER PUBLICATIONS

Office Action dated Sep. 22, 2020 for U.S. Appl. No. 16/744,457 (pp. 1-7).
Notice of Allowance dated Jan. 6, 2021 for U.S. Appl. No. 16/744,457 (pp. 1-8).
Australian Examination Report No. 1 for App. No. AU2020204050, dated May 21, 2021, 2 pages.
Office Action (Non-Final Rejection) dated Feb. 24, 2022 for U.S. Appl. No. 17/226,767 (pp. 1-6).
Office Action (Notice of Allowance and Fees Due (PTOL-85)) dated May 23, 2022 for U.S. Appl. No. 17/226,767 (pp. 1-8).
Australian Examination Report No. 1 issued in App. No. AU2022203442, dated Jul. 3, 2023, 3 pages.

* cited by examiner

METHOD OF OPERATING A GAMING SYSTEM, A GAMING SYSTEM AND A GAME CONTROLLER

RELATED APPLICATIONS

The present application is a continuation of U.S. patent application Ser. No. 17/226,767, filed Apr. 9, 2021, which is a continuation of U.S. patent application Ser. No. 16/744,457, filed Jan. 16, 2020, which is a continuation of U.S. patent application Ser. No. 16/196,124, filed Nov. 20, 2018, which is a continuation of U.S. patent application Ser. No. 15/274,582, filed Sep. 23, 2016, which claims priority to Australia Application No. 2015903883, filed Sep. 23, 2015, disclosures of which are incorporated herein by reference in their entirety.

BACKGROUND OF THE INVENTION

Gaming machines are known where symbols are retained for a further game. Such symbols are known as "held" or "sticky" symbols.

A need exists for alternative gaming systems.

BRIEF SUMMARY OF THE INVENTION

In a first aspect, the invention provides an electronic method of operating a gaming system comprising a display, a game controller, and a memory storing symbol data, the method comprising:

- selecting, using the game controller, a plurality of symbols from the symbol data;
- displaying the selected symbols on the display at respective ones of a plurality of symbol display positions arranged in a plurality of columns on the display,
- upon the selected symbols including one or more designated symbols, retaining, using the game controller, each designated symbol for a subsequent game round at the symbol display position at which the designated symbol was displayed;
- in the subsequent game round, selecting, using the game controller, a plurality of symbols from the symbol data;
- upon a further designated symbol being selected for display at a display position at which a designated symbol is retained, modifying, using the game controller, the retained designated symbol to indicate that a win containing the retained designated symbol will be increased; and
- upon the selected symbols in the subsequent game round corresponding to a winning outcome incorporating the modified retained designated symbol, making, using the game controller, an award of an award value corresponding to the winning outcome modified by an increase.

In an embodiment, the increase includes a multiplier.

In an embodiment, the method comprises retaining the retained designated symbol incorporating the multiplier for a further game round at the symbol display position at which the designated symbol was displayed,

- in the further game round, selecting, using the game controller, a plurality of symbols from the symbol data;
- upon a further designated symbol being selected for display at a display position at which a designated symbol incorporating a multiplier is retained, modifying, using the game controller, the retained designated symbol by increasing the multiplier; and
- upon the selected symbols in the further game round corresponding to a winning outcome incorporating the modified retained designated symbol with the increased multiplier, making, using the game controller, an award of an award value corresponding to the winning outcome multiplied by the increased multiplier.

In an embodiment, the method comprises retaining the retained designated symbol incorporating the multiplier for a further game round at the symbol display position at which the designated symbol was displayed,

- in the further game round, selecting, using the game controller, a plurality of symbols from the symbol data;
- upon a further designated symbol being selected for display at a display position at which a designated symbol incorporating a multiplier is retained and provided the multiplier has not previously reached a defined value, modifying, using the game controller, the retained designated symbol by increasing the multiplier; and
- upon the selected symbols in the further game round corresponding to a winning outcome incorporating the modified retained designated symbol with the increased multiplier, making, using the game controller, an award of an award value corresponding to the winning outcome multiplied by the increased multiplier.

In an embodiment, the symbols are selected in a free game of a series of free games and the subsequent game round is any remaining one of the free games.

In an embodiment, the symbols are selected in a free game of a series of free games, the subsequent game round is a remaining one of the free games, and the further game round is a further remaining one of the free games.

In an embodiment, the designated symbol is a wild symbol.

In a second aspect, the invention provides an electronic gaming system comprising:

- a display;
- a memory storing symbol data; and
- a game controller arranged to:
  - select a plurality of symbols from the symbol data;
  - control the display the selected symbols on the display at respective ones of a plurality of symbol display positions arranged in a plurality of columns on the display,
  - upon the selected symbols including one or more designated symbols, retain each designated symbol for a subsequent game round at the symbol display position at which the designated symbol was displayed;
  - in the subsequent game round, select a plurality of symbols from the symbol data;
  - upon a further designated symbol being selected for display at a display position at which a designated symbol is retained, modify the designated symbol to indicate that a win containing the retained designated symbol will be increased; and
- upon the selected symbols in the subsequent game round corresponding to a winning outcome incorporating the modified retained designated symbol, make an award of an award value corresponding to the winning outcome modified by an increase.

In an embodiment, the increase includes a multiplier.

In a third aspect, the invention provides an electronic game controller for a gaming system comprising a display and a memory storing symbol data, the game controller comprising:

a symbol selector arranged to select a plurality of symbols from the symbol data;

a display controller arranged to control the display the selected symbols on the display at respective ones of a plurality of symbol display positions arranged in a plurality of columns on the display, a symbol holder arranged to, upon the selected symbols including one or more designated symbols, retain each designated symbol for a subsequent game round at the symbol display position at which the designated symbol was displayed, wherein in the subsequent game round, the symbol selector selects a plurality of symbols from the symbol data;

a held symbol modifier arranged to, upon a further designated symbol being selected for display at a display position at which a designated symbol is retained, modify the retained designated symbol to incorporate a multiplier; and an outcome evaluator arranged to, upon the selected symbols in the subsequent game round corresponding to a winning outcome incorporating the modified retained designated symbol, make an award of an award value corresponding to the winning outcome multiplied by the multiplier.

In a fourth aspect, the invention provides an electronic method of operating a gaming system comprising a display, a game controller, and a memory storing reel strip data for a plurality of reels, the plurality of reels being divided between a first subset of reels and a second subset of reels during a re-spin feature, the method comprising upon a re-spin condition being met:

(a) initiating, using the game controller, the re-spin feature;

(b) selecting, using the game controller, a plurality of symbols from the reel strip data of each reel of the first subset and controlling the display to display spinning of each reel of the first subset;

(c) selecting, using the game controller, a plurality of symbols from the reel strip data of each reel of the second subset;

(d) controlling, using the game controller, the display to display spinning and stopping of each reel of the second subset at a respective stop position at which the plurality of selected symbols of each reel of the second subset are displayed at respective ones of a plurality of second symbol display positions;

(e) upon one or more of the reels of the second subset including a designated symbol retaining, using the game controller, each designated symbol at the symbol display position at which the designated symbol was displayed for a subsequent re-spin;

(f) repeating, using the game controller, steps (c) to (e) until no additional designated symbols are selected;

(g) controlling, using the game controller, the display to display stopping of each reel of the first subset at a respective stop positions at which the plurality of selected symbols of each reel of the first subset are displayed at respective ones of a plurality of first symbol display positions; and h) making, using the game controller, an award if the displayed symbols correspond to one or more winning outcomes.

In an embodiment, there is one reel in the first subset.

In an embodiment, the designated symbol is a wild symbol.

In a fifth aspect, the invention provides an electronic gaming system comprising a display, a memory storing reel strip data for a plurality of reels, the plurality of reels being divided between a first subset of reels and a second subset of reels during a re-spin feature, and a game controller arranged to upon a re-spin condition being met:

(a) initiate the re-spin feature;

(b) select a plurality of symbols from the reel strip data of each reel of the first subset and control the display to display spinning of each reel of the first subset;

(c) select a plurality of symbols from the reel strip data of each reel of the second subset;

(d) control the display to display spinning and stopping of each reel of the second subset at a respective stop position at which the plurality of selected symbols of each reel of the second subset are displayed at respective ones of a plurality of second symbol display positions;

(e) upon one or more of the reels of the second subset including a designated symbol retain each designated symbol at the symbol display position at which the designated symbol was displayed for a subsequent re-spin;

(f) repeat (c) to (e) until no additional designated symbols are selected;

(g) control the display to display stopping of each reel of the first subset at a respective stop positions at which the plurality of selected symbols of each reel of the first subset are displayed at respective ones of a plurality of first symbol display positions; and h) make an award if the displayed symbols correspond to one or more winning outcomes.

In a sixth aspect, the invention provides an electronic game controller for a gaming system comprising a display, a memory storing reel strip data for a plurality of reels, the plurality of reels being divided between a first subset of reels and a second subset of reels during a re-spin feature, the game controller comprising:

(a) a re-spin feature controller arranged to initiate the re-spin feature upon a re-spin condition being met;

(b) a symbol selector arranged to select a plurality of symbols from the reel strip data of each reel of the first subset and a display controller arranged to control the display to display spinning of each reel of the first subset;

(c) the symbol selector also arranged to select a plurality of symbols from the reel strip data of each reel of the second subset;

(d) the display controller also arranged to control the display to display spinning and stopping of each reel of the second subset at a respective stop position at which the plurality of selected symbols of each reel of the second subset are displayed at respective ones of a plurality of second symbol display positions;

(e) a symbol holder arranged to, upon one or more of the reels of the second subset including a designated symbol, retain each designated symbol at the symbol display position at which the designated symbol was displayed for a subsequent re-spin;

(f) the re-spin feature controller also arranged to repeat (c) to (e) until no additional designated symbols are selected;

(g) the display controller further arranged to control the display to display stopping of each reel of the first subset at a respective stop positions at which the plurality of selected symbols of each reel of the first subset are displayed at respective ones of a plurality of first symbol display positions; and h) an outcome evaluator arranged to make an award if the displayed symbols correspond to one or more winning outcomes.

In a seventh aspect, the invention provides computer program code which when executed implements the above method.

In an eighth aspect, the invention provides a tangible computer readable medium comprising the above program code.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Figure 1:
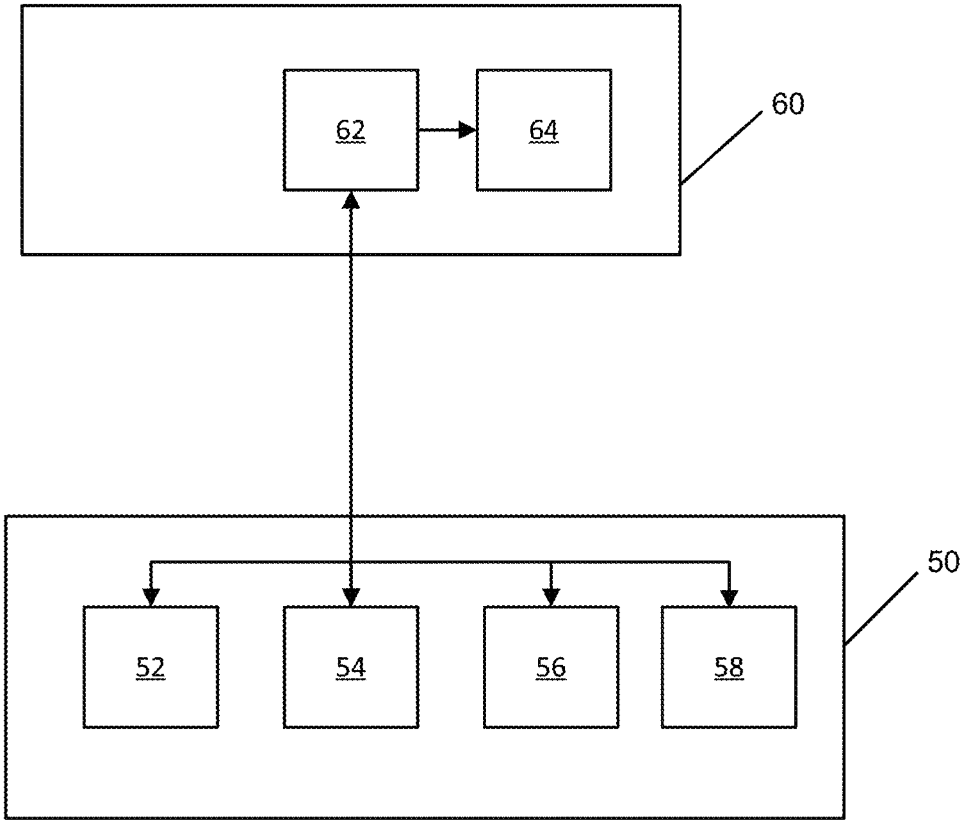
FIG. 1 is a block diagram of the core components of a gaming system.

Referring to the drawings, there is shown a gaming system having a game controller having components that enable the implementation of a game where a designated symbol such as a wild symbol can be retained for a further game round such as a game of a series of free games. In an embodiment, the wild symbol is modified to incorporate a multiplier if another wild symbol is selected for the same position.

The components of the game controller also enable the implementation of a re-spin feature where when it is initiated a first subset of the reels (e.g. a first reel) is spun while s second subset of the reels (e.g. the remaining four reels) are spun and re-spun provided an additional designated symbol is added to the selected symbol by virtue of the reels. In the re-spin, each selected designated symbol is held. When no additional designated symbol is selected, the first reel stops spinning and the symbols are evaluated for winning outcomes.

General Construction of Gaming System

The gaming system can take a number of different forms. In a first form, a standalone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in standalone gaming machine mode, "thick client" mode or "thin client" mode depending on the game being played, operating conditions, and so on. Other variations will be apparent to persons skilled in the art.

Irrespective of the form, the gaming system has several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions to play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play rules are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
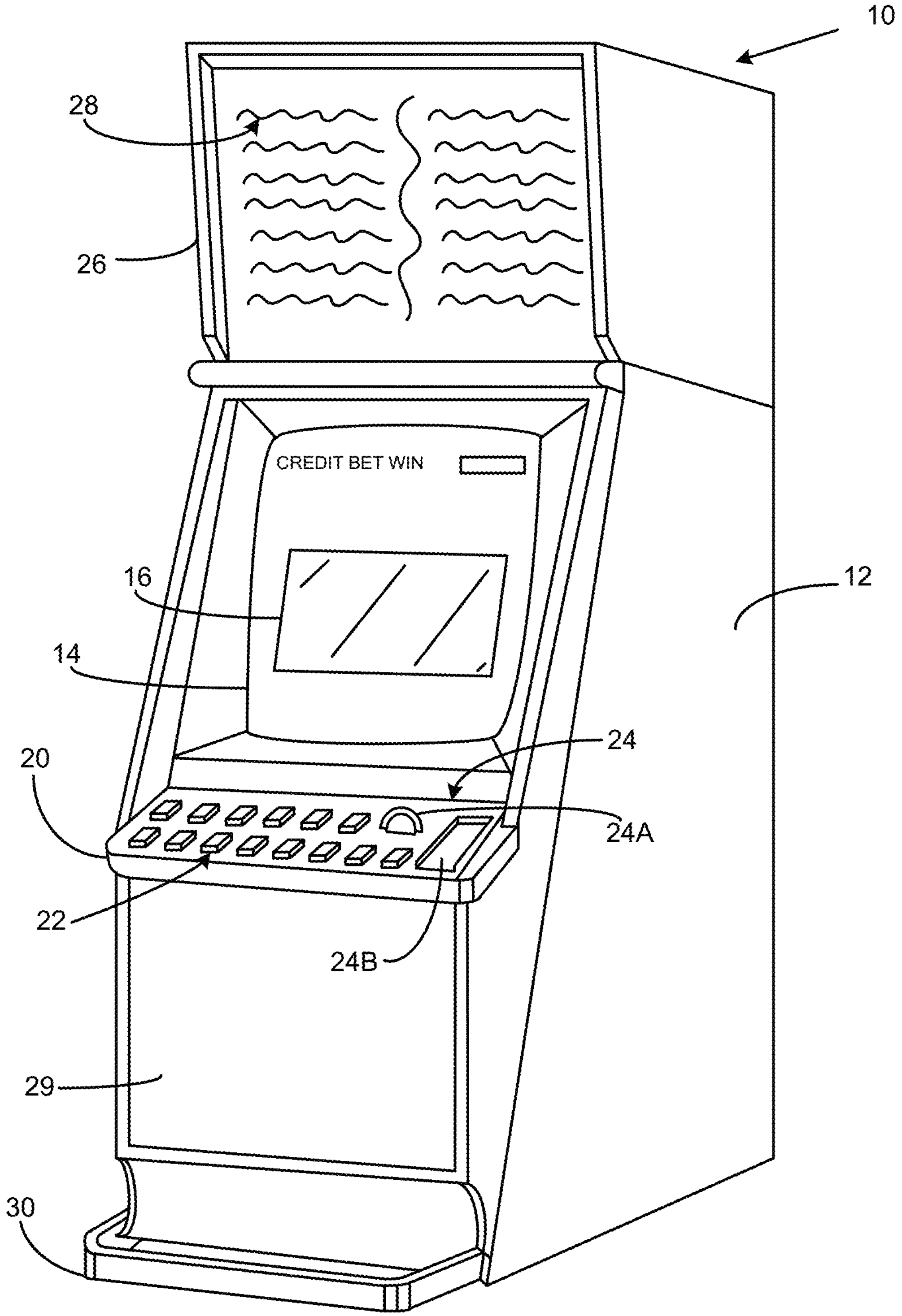
FIG. 2 is a perspective view of a standalone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module that is accessed in response to insertion of the player tracking device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a liquid crystal display. The display 14 may any other suitable video display unit, such as an OLED display. The top box 26 may also include a display, which may be of the same type as the display 14, or of a different type.

Figure 3:
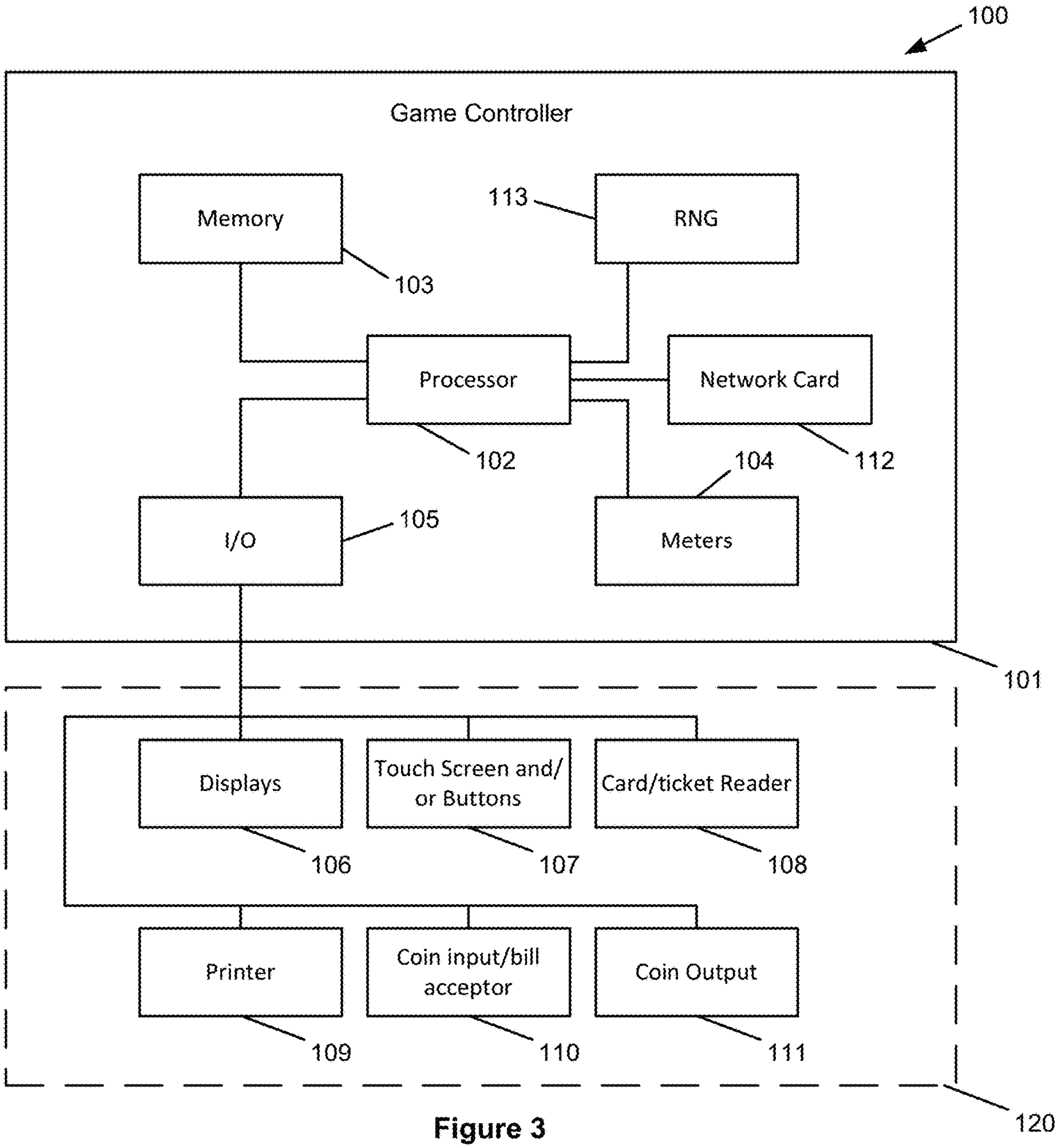
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can "press" by touching the screen where they are displayed.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
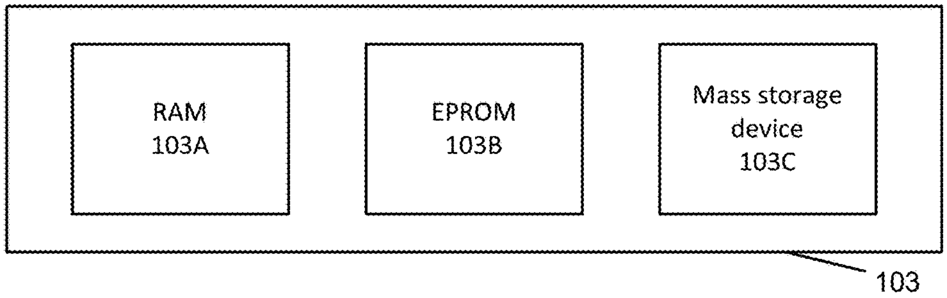
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106, 107, 108, 109, 110, 111 to be provided remotely from the game controller 101.

Figure 5:
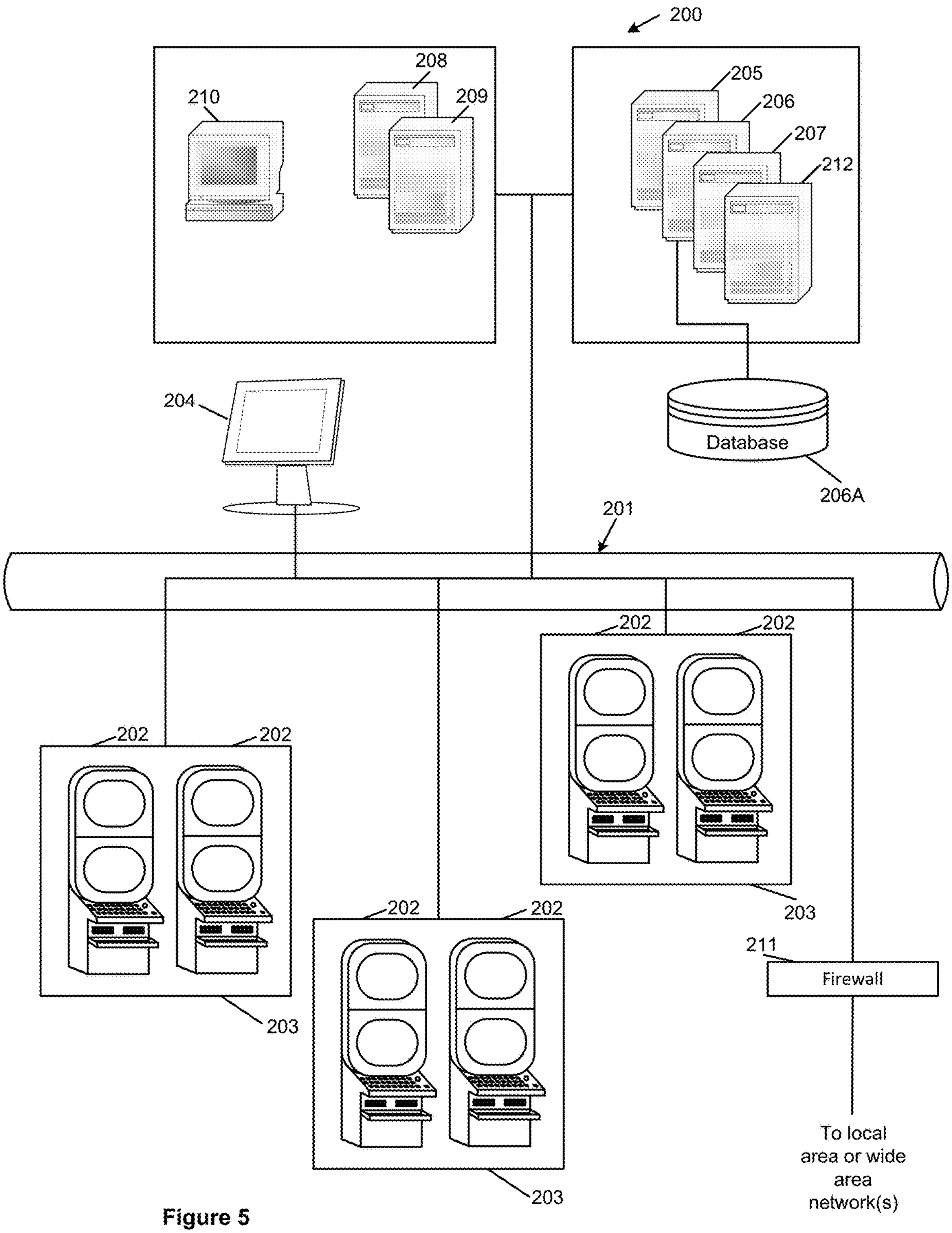
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10, 100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

The player operates the game play mechanism 56 to specify a wager which will be evaluated for this play of the game and initiates a play of the game. Persons skilled in the art will appreciate that a player's wager can be varied from game to game dependent on player selections. In most spinning reel games, it is typical for the player's wager to be made up of a selection as to how the game outcome will be evaluated by specifying what parts of the game outcome will qualify for winning outcomes and a multiplier that will apply to each winning outcome. For example, a player's wager may be based on how many lines they play in each game—e.g. a minimum of one line up to the maximum number of lines allowed by the game (noting that not all permutations of win lines may be available for selection) and an amount per line—e.g. one, two or five credits. Winning outcomes on an activated win line may be evaluated based on a pay table that specifies the amount awarded for a one credit per line wager multiplied by the amount wagered per line.

Such win lines are typically formed by a combination of symbol display positions, one from each reel, the symbol display positions being located relative to one another such that they form a line.

In many games, the gaming machine may award winning outcomes which are not strictly limited to the lines they have selected, for example, "scatter" pays are awarded independently of a player's selection of pay lines.

Persons skilled in the art will appreciate that in other embodiments, the player may select a number of reels to play. Games of this type are marketed under the trade name "Reel Power" by Aristocrat Leisure Industries Pty Ltd and are also known as "ways" to win games. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reel, the active display positions being all display positions of each selected reel and the designated display position of the non-selected reels. As a result for five reels and fifteen display positions there are 243 ways to win.

In the embodiment described below, the display positions of the symbol display are arranged in a rectangular matrix comprising a plurality of columns and a plurality of rows. However, other arrangements are known in the gaming industry and could be employed in embodiments of the invention. For example, in some arrangements there are more symbols in some columns than others, such as 3-4-3-4-3 arrangement of seventeen display positions corresponding to respective ones of five reels. In such arrangements, the columns of four symbols can be arranged so that they are off-set or staggered relative to the columns having three symbols so that the middle two symbols in the columns of four symbols share boundaries with two symbols of each neighbouring reel.

Figure 6:
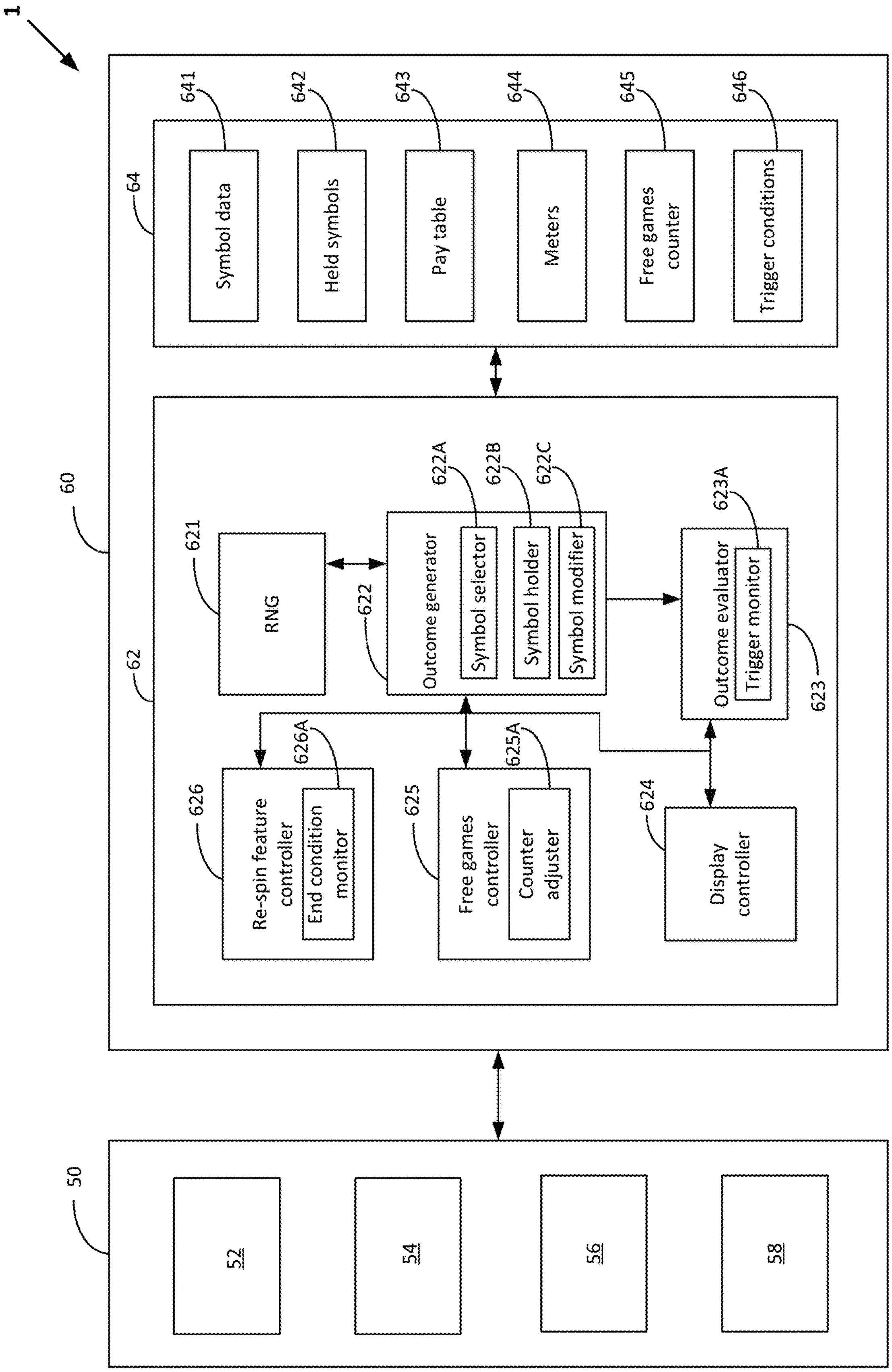
FIG. 6 is a further block diagram of a gaming system.

In FIG. 6, the processor 62 of game controller 60 is shown implementing a number of modules based on program code and data stored in memory 64. Persons skilled in the art will appreciate that one or more of the modules could be implemented in some other way, for example by a dedicated circuit.

These modules include the outcome generator 622 which operates in response to the player's operation of game play mechanism 56 to place a wager and initiate a play of the game and generates a game outcome which will then be evaluated by award evaluator 623. In the embodiment, the first part of forming the game outcome is for a symbol selector 622A to select symbols from a set of symbols specified by symbol data 641 using random number generator 621. The selected symbols are advised to the display controller 624 which causes them to be displayed on display 54 at a set of display positions.

One example of selecting symbols is for the symbol selector 622A to select symbols for display from a plurality of symbol sets defining reel strips 641 corresponding to respective ones of a plurality of spinning reels. The reel strips 641 specify a sequence of symbols for each reel. In an embodiment, the symbol selector 622A selects the symbols for display by selecting a stopping position in the sequence. In one example, three symbols of each of five reels are displayed such that symbols are displayed at fifteen display positions on display 54. It is known to use a probability table stored in memory 64 to vary the odds of a particular stop position being selected. Other techniques can be used to control the odds of particular outcomes occurring to thereby control the return to player of the game.

Once the symbols are selected, they are evaluated by outcome evaluator 623 which determines whether the selected symbols include any winning outcomes based on pay table 643. If the selected symbols include one or more winning outcomes, a win meter of meters 644 is updated with the value and credit is determined based on the pay table and the player's wager. That is, in accordance with the player's win entitlement. The outcome evaluator 63 also includes a trigger monitor 623A which determines whether the selected symbols meet one of the trigger conditions 646 stored in memory 64.

In the embodiment, there are separate trigger conditions which result respectively in the award of a free game series feature and a re-spin feature.

When the trigger monitor 623A determines that the trigger condition 646 for the free games feature is met, the free games controller 625 initiates a series of free games. In this respect, a free game involves a spin of the reels for which a player does not place an additional wager. As such, a free game can also be understood of as a game round of an overall game upon which a player has placed a wager. That is, the single game can be made up of a number of separate game rounds. Depending on the implementation, the reel strips used in the free games may be the same or different to those used in the base game.

When the free games are started, the free games controller 625 sets a counter 645 in memory. As the games are conducted, the counter is adjusted by counter adjuster 625A of free game controller 625. When all of the free games have been conducted (and hence the counter has reached zero) the series of free games ends. During the free games, the symbol selector 622A selects symbols for display on the display positions from each of the respective reels. When the selected symbols include a designated symbol, which in an embodiment is a WILD symbol which can substitute for all other symbols, the designated symbol is held for future games by symbol holder 622B which updates memory 64 to define the positions that are occupied by held symbols 642.

In this respect, the embodiment departs from the conventional use of the held symbols. In a conventional game involving held symbols, new symbols are not selected for the display position at which the held symbol is displayed. In the embodiment, after a symbol has been held, in a subsequent free game a new symbol is selected for display at the symbol display position and if a further WILD symbol is selected for a symbol display position already occupied by a held WILD symbol, the held WILD symbol is modified, or "upgraded" by incorporating a multiplier. For example, if a second WILD symbol lands at a position occupied by a first WILD symbol, the WILD symbol attracts a times two ("×2") multiplier. When a third symbol lands at the same position, the WILD symbol attracts a times three ("×3") multiplier. In an embodiment, as described in further detail below, if a WILD symbol lands on a symbol which is already a ×3 multiplier, the multiplier is not adjusted. That is, in this embodiment, there is a cap on the value which a multiplier can reach. In other embodiments, there may not be a cap on the multiplier. In other embodiments, the multipliers can be modified in a different way provided at least some further occurrences of a designated symbol result in an increased multiplier. For example, when a second designated symbol lands on a position occupied by a designated symbol, the multiplier can be set to ×3 and when a further multiplier lands, the multiplier can be set to ×4. In another example, the multiplier may change from ×2 to ×4.

In each of the embodiments, the changes are implemented by a symbol modifier 622C which updates the data associated with the relevant held symbols 642 to indicate the multiplier that currently applies.

During each round of the free game series, the selected symbols are evaluated by outcome evaluator 623 using pay table 643. For each winning outcome, the award is multiplied by the multipliers associated with any WILD symbols that substitute as part of the winning outcome.

Figure 7:
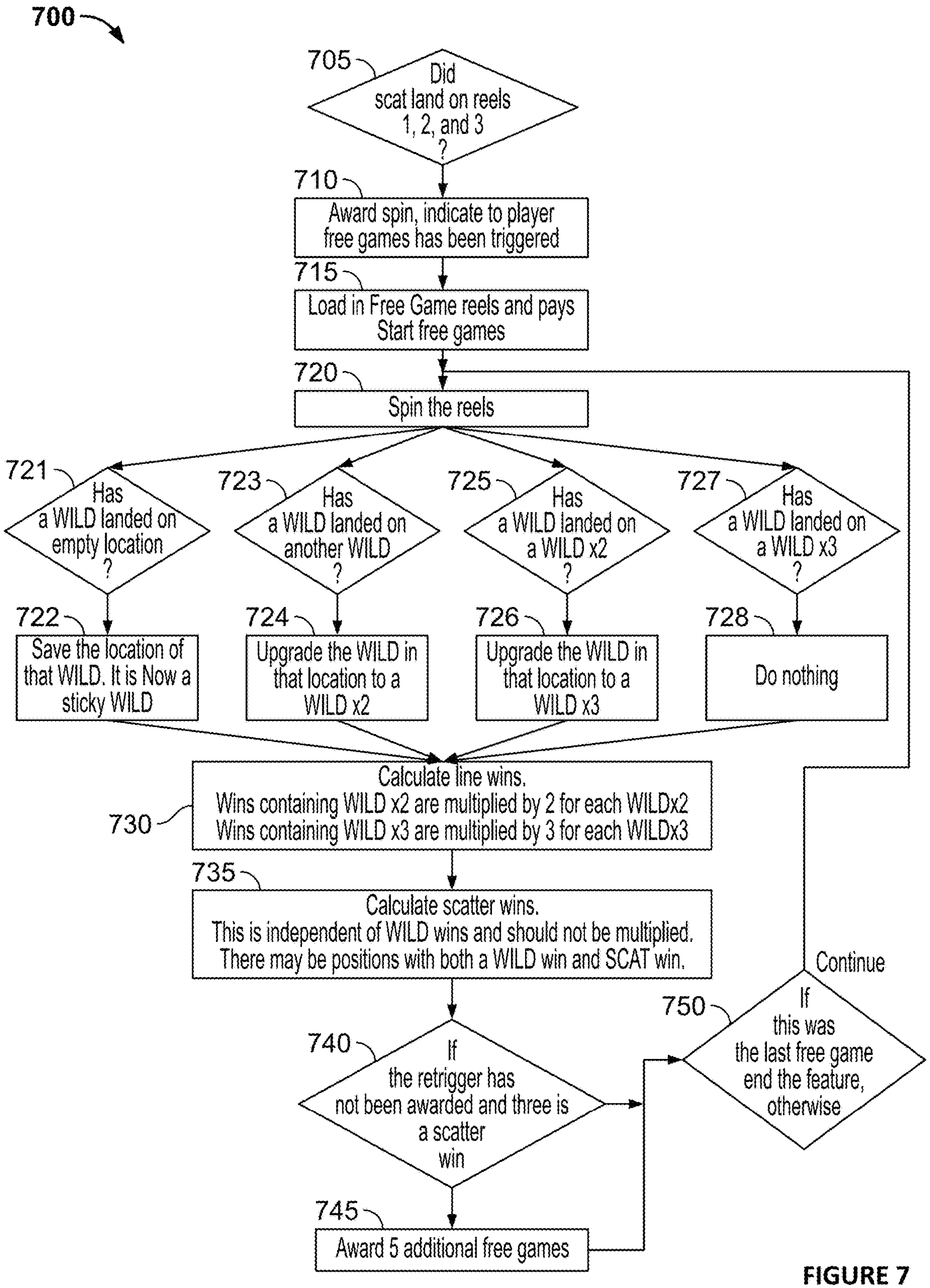
FIG. 7 is a flow chart of an embodiment of a free games feature.

FIG. 7 shows a flow chart of an embodiment of a method 700 for conducting a free game series. As indicated, at step 705 it is determined whether a scatter symbol ("SCAT") lands on each of reels 1, 2, and 3. That is, the occurrence of scatter symbols on each of reels 1-3 is the trigger condition. The trigger monitor 623A causes the free game series to start. The method then involves awarding a spin and indicating 710 to the player that free games have been triggered. The method then involves changing the reels and pay tables 715 to apply during the free game series and starting the free games. At step 720, the method involves spinning the reels. That is, selecting stopping positions using the random number generator 621 to determine the symbols that will appear at the symbol display positions corresponding to respective ones of the reels. In this example, there are 5 reels. The method then involves a number of steps which can result in a symbol being held, or a held symbol being modified. At step 721, it is determined whether a WILD symbol has landed on an empty location. For each location at which a WILD symbol has landed and which it is empty, the location of that WILD is saved as part of held symbol 642 and that symbol becomes a "sticky" WILD which will be retained at that symbol position in subsequent games of free games series.

The method also involves determining 723 whether a WILD has landed on another WILD symbol. If it has, the WILD at that location is upgraded to be a "WILD ×2". That is, a ×2 multiplier is added to the WILD symbol. Similarly, if a WILD lands 725 on a WILD ×2, the WILD ×2 symbol at that location is upgraded to a WILD ×3 symbol 726. Finally, in this embodiment, there is a cap on the size to which a WILD symbol can grow and hence if a WILD lands 727 on a WILD ×3 symbol, nothing is done 728.

The method then involves calculating 730 which win lines played by the player have winning outcomes on them taking into account the usual function of a WILD symbol as a substitute symbol. Wins containing WILD ×2 are multiplied by 2 for each WILD ×2 symbol 730. Wins containing WILD ×3 are multiplied by 3 for each WILD ×3. Independently of the wins on active win lines played by the player, it is determined whether there are any scatter wins 735.

At step 740, it is determined whether a re-trigger has been awarded. In this example, the re-trigger is the same as the original trigger requiring a SCAT symbol to land on reels 1, 2, 3. If a re-trigger has not previously been awarded and there is a scatter win, 5 additional free games are awarded 745. Thus, in this example, counter adjuster 625A updates the free games counter adjuster 625 by adding a further 5 free games. In this example, the re-trigger can only occur once. At step 750, it is determined whether this was the last free game (i.e. the counter has reached 0) and if so, the feature has ended. Otherwise, the method continues by spinning the reels again 720 to conduct the next free game.

If the trigger condition determined by the trigger monitor 623 from a game outcome is the re-spin feature, the re-spin feature controller 626 controls the conduct of the re-spin feature. Unlike the free games feature, the re-spin feature does not involve the conduct of a defined number of games but rather is conducted until an end condition is met. To this end, the re-spin feature controller contains an end condition monitor 626A which determines whether an end condition has been met in relation to the re-spin feature. In this example, the end condition is that a re-spin of a subset of the reels does not result in the addition of an additional designated symbol to the displayed symbols as described in further detail below.

In this respect, when the re-spin feature is initiated, re-spin feature controller 626 causes the symbol selector 622A to select symbols for all of the reels 621 and all of the reels are initially displayed as spinning towards the stop positions selected by the symbol selector 622A in accordance with the technique described above. A first subset of the reels are displayed as continuing to spin while the second subset of reels are displayed as stopping at stop positions. In one example, the first subset is reel 1 and the second subset is reels 2, 3, 4 and 5. If the selected symbols of the second subset include a designated symbol, again a WILD symbol, symbol holder 622B retains the symbol as a held symbol 642 for a further re-spin. In each re-spin, the symbol selector 622A selects symbols for the symbol positions of each of the reels of the second subset of reels that are not already occupied by held symbols. The process continues until the symbol selected by the symbol selector 622A includes no further designated symbols. At this point, the end condition monitor 626 determines that an end condition has occurred in respect of the re-spin feature and causes the reels of the first subset to stop at the selected position. The symbols which are then displayed are evaluated by outcome evaluator 623 based on pay table 643 to determine whether they include any winning outcomes on active win lines and any awards are made by updating the win meter of meters 644.

Figure 8:
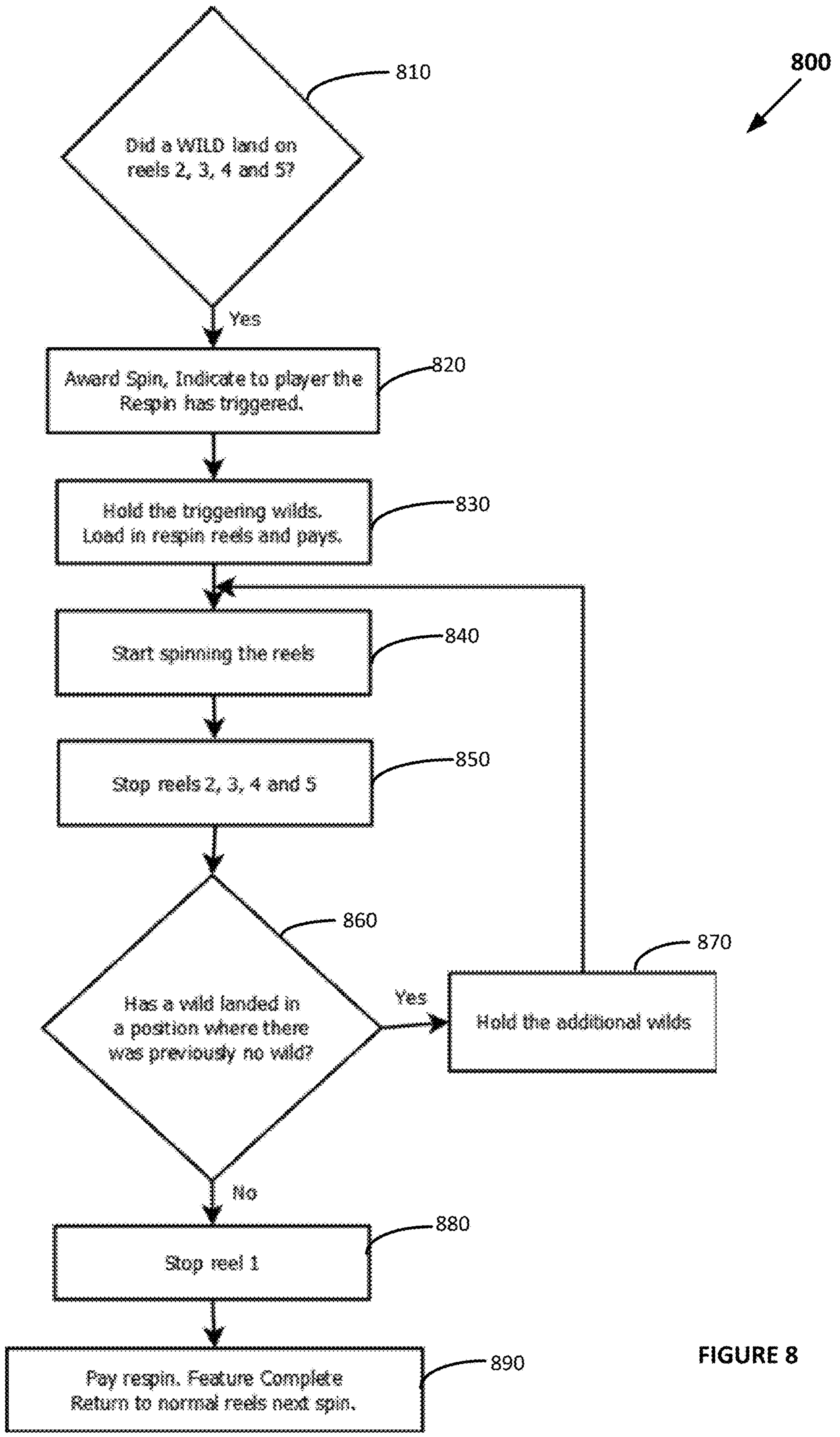
FIG. 8 is a flow chart of an embodiment of a re-spin feature.

FIG. 8 shows a flow chart 800 of a method of an embodiment of such a re-spin feature. In FIG. 8, it is shown that the method involves determining whether a WILD symbol lands on reels 2, 3, 4 and 5. This is the trigger condition for the re-spin feature game. If a WILD symbol lands on those reels, the method involves awarding the re-spin feature and indicating to the player that a re-spin has triggered 820. The method then involves holding the triggering WILDS at the positions at which they were displayed, loading the reels that are used for the re-spin games as well as updating the pay table 643 to be the one used for a re-spin game 830.

The method then involves starting spinning 840 all of the reels. At step 850, the method involves stopping reels 2, 3, 4 and 5. It is then determined whether a WILD has landed in a position where there was previously no WILD. If the answer is Yes, the method involves holding 870 the additional WILDS and repeating the step 840 of spinning the reels in respect of reels 2, 3, 4 and 5. If the answer is No, then the method involves stopping 880 reel 1. That is, the method involves repeating the steps of spinning the reels of the second subset (reels 2, 3, 4 and 5) until such time as no additional WILDS are held at which time the first reel is stopped. The method then involves evaluating the selected symbols based on the pay table 643 for the re-spin feature and making any awards by updating the meters 644.

In some embodiments, an eligibility criteria may be applied for the player to be eligible for the free game series game or the re-spin feature, for example that the player has made a certain sized wager, made an ante bet, selected all win lines, played sufficient games, or the player is a member of a loyalty program.

The trigger event may be, a symbol combination in the game, occurrence of a specific symbol in the game, purchased, be caused by another connected system, based on turnover, based on a random evaluation, etc.

Typically, a winning outcome will result in some form of award being made such as an award of credits. Such an award may never actually be physically received by a player. For example, many gaming systems provide a player with a double or nothing gamble feature, where the player can double or forfeit their credits before commencing another play of the game or cashing out. Further, as credits are fungible, once credits have been added to the credit meter it is not possible to distinguish between credits which exist because the player has input cash or the like and credits resulting from an award.

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor of a gaming system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art will appreciate that program code provides a series of instructions executable by the processor.

It will be understood to persons skilled in the art of the invention that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

What is claimed is:

1. A gaming machine, comprising:

one or more display devices;

a game controller executing instructions from a memory, wherein execution of the instructions causes the game controller to at least:

present symbols at display positions of the one or more display devices, wherein the display positions comprise a first subset of display positions and a second subset of display positions; and in response to a trigger condition:

present an update of the symbols in the second subset by holding each instance of a designated symbol in the second subset at its respective display position, and presenting a respective replacement symbol at each display position in the second subset that is not holding the designated symbol.

2. The gaming machine of claim 1, wherein execution of the instructions causes the game controller to, in response to at least one replacement symbol being the designated symbol, present another update of the symbols in the second subset by holding each instance of the designated symbol in the second subset at its respective display position, and presenting a respective replacement symbol at each display position in the second subset that is not holding the designated symbol.

3. The gaming machine of claim 2, wherein execution of the instructions causes the game controller to continue updating the symbols in the second subset until an update fails to present at least one replacement symbol that is the designated symbol.

4. The gaming machine of claim 1, wherein the first subset consists of a single column of display positions from the columns of display positions.

5. The gaming machine of claim 1, wherein:

the first subset consists of a single leftmost column of display positions from the columns of display positions per a perspective of a player facing the one or more display devices; and the second subset consists of remaining rightmost columns of display positions from the columns of display positions per the perspective of the player facing the one or more display devices.

6. The gaming machine of claim 1, wherein:

the first subset consists of a single leftmost column of display positions from the columns of display positions per a perspective of a player facing the one or more display devices; and the second subset consists of four rightmost columns of display positions from the columns of display positions per the perspective of the player facing the one or more display devices.

7. The gaming machine of claim 1, comprising:

a credit input and wherein execution of the instructions causes the game controller to establish a credit balance in response to the credit input interacting with a physical item having an associated credit value.

8. The gaming machine of claim 1, wherein execution of the game controller causes the game controller to determine that the trigger condition has occurred in response to each column of display positions in the second subset including at least one instance of the designated symbol.

9. A method, comprising:

presenting symbols in display positions of one or more display devices, wherein the display positions include a first column of display positions and second columns of display positions; and holding each instance of a designated symbol in the second columns at its respective display position; and presenting a respective replacement symbol at each display position in the second columns that is not holding the designated symbol.

10. The method of claim 9, comprising, in response to at least one replacement symbol being the designated symbol:

holding each instance of the designated symbol in the second columns at its respective display position; and presenting a respective replacement symbol at each display position in the second columns that is not holding the designated symbol.

11. The method of claim 10, comprising continually holding each instance of the designated symbol and presenting a respective replacement symbol until the presenting the respective replacement symbol fails to present at least one replacement symbol that is the designated symbol.

12. The method of claim 11, comprising, in response to the presenting of the respective replacement symbol failing to present at least one replacement symbol:

presenting symbols at the first column of display positions; and presenting an award based on the symbols in the first column of display positions and the symbols in the second columns of display positions.

13. The method of claim 9, wherein the first column of display positions consists of a single column of display positions.

14. The method of claim 9, wherein:

the first column of display positions consists of a single leftmost column of display positions per a perspective of a player facing the one or more display devices; and the second columns of display positions consists of remaining rightmost columns of display positions per the perspective of the player facing the one or more display devices.

15. The method of claim 9, wherein:

the first column of display positions consists of a single leftmost column of display positions per a perspective of a player facing the one or more display devices; and the second column of display positions consists of four rightmost columns of display positions per the perspective of the player facing the one or more display devices.

16. The method of claim 9, comprising, in response to failing to present at least one replacement symbol that is a designated symbol:

presenting symbols at the first column of display positions; and presenting an award based on the symbols in the first column of display positions and the symbols in the second column of display positions.

17. A non-transitory computer readable storage medium comprising instructions that when executed cause a computing device to:

present symbols in display positions of one or more display devices, wherein the display positions include a first column of display positions and second columns of display positions; and in response to a trigger condition:

hold each instance of a designated symbol in the second columns at its respective display position; and.

present a respective replacement symbol at each display position in the second columns that is not holding the designated symbol.

18. The non-transitory computer readable storage medium of claim 17, wherein the instructions, when executed, cause the computing device, in response to at least one replacement symbol being the designated symbol, to:

hold each instance of the designated symbol in the second columns at its respective display position; and presenting a respective replacement symbol at each display position in the second columns that is not holding the designated symbol.

19. The non-transitory computer readable storage medium of claim 17, wherein the instructions, when executed, cause the computing device, in response to the replacement symbols failing to include at least one designated symbol, to:

present symbols at the first column of display positions; and present an award based on the symbols in the first column of display positions and the symbols in the second column of display positions.

20. The non-transitory computer readable storage medium of claim 17, wherein:

the first column of display positions consists of a single leftmost column of display positions per a perspective of a player facing the one or more display devices; and the second columns of display positions consists of remaining rightmost columns of display positions per the perspective of the player facing the one or more display devices.

* * * * *